US011000809B2

(12) United States Patent
Spulber et al.

(10) Patent No.: US 11,000,809 B2
(45) Date of Patent: May 11, 2021

(54) DIBLOCK COPOLYMER VESICLES AND SEPARATION MEMBRANES COMPRISING AQUAPORIN WATER CHANNELS AND METHODS OF MAKING AND USING THEM

(71) Applicant: AQUAPORIN A/S, Kgs. Lyngby (DK)

(72) Inventors: Mariana Spulber, Charlottenlund (DK); Karen Gerstandt, Poyenberg (DE)

(73) Assignee: AQUAPORIN A/S, Kgs. Lyngby (DK)

( * ) Notice: Subject to any disclaimer, the term of this patent is extended or adjusted under 35 U.S.C. 154(b) by 127 days.

(21) Appl. No.: 16/483,852

(22) PCT Filed: Feb. 6, 2018

(86) PCT No.: PCT/EP2018/052912
§ 371 (c)(1),
(2) Date: Aug. 6, 2019

(87) PCT Pub. No.: WO2018/141985
PCT Pub. Date: Aug. 9, 2018

(65) Prior Publication Data
US 2020/0016548 A1 Jan. 16, 2020

(30) Foreign Application Priority Data

Feb. 6, 2017  (GB) .................................... 1701945
Feb. 6, 2017  (WO) ................. PCT/EP2017/052567
May 2, 2017  (SG) ....................... SG10201703559Q
Dec. 20, 2017  (DK) ............................. PA201770963

(51) Int. Cl.
*B01D 69/14* (2006.01)
*B01D 61/00* (2006.01)
*B01D 61/02* (2006.01)
*B01D 63/10* (2006.01)
*B01D 69/02* (2006.01)
*B01D 69/12* (2006.01)
*B01D 71/56* (2006.01)
*B01D 71/70* (2006.01)
*B01D 71/80* (2006.01)

(52) U.S. Cl.
CPC ......... *B01D 69/144* (2013.01); *B01D 61/002* (2013.01); *B01D 61/025* (2013.01); *B01D 63/10* (2013.01); *B01D 69/02* (2013.01); *B01D 69/125* (2013.01); *B01D 71/56* (2013.01); *B01D 71/70* (2013.01); *B01D 71/80* (2013.01); *B01D 2325/38* (2013.01)

(58) Field of Classification Search
CPC .... B01D 69/02; B01D 69/125; B01D 69/144; B01D 61/002; B01D 61/025; B01D 63/10; B01D 71/56; B01D 71/58; B01D 71/70; B01D 71/80; B01D 71/82; B01D 2325/38
See application file for complete search history.

(56) References Cited

U.S. PATENT DOCUMENTS 4,277,344 A     7/1981  Cadotte
2012/0080377 A1  4/2012  Jensen et al.

FOREIGN PATENT DOCUMENTS

| WO | 2006122566 A2 | 11/2006 |
| WO | 2007033675 A1 | 3/2007 |
| WO | 2010146365 A1 | 12/2010 |
| WO | 2013043118 A1 | 3/2013 |
| WO | 2014108827 A1 | 7/2014 |
| WO | 2014128293 A1 | 8/2014 |
| WO | WO 2015/166038 A1 * | 11/2015 |
| WO | 2017137361 A1 | 8/2017 |

OTHER PUBLICATIONS

Dieu et al, European Journal of Pharmaceutics and BioPharmaceutics, Polymersomes Conjugated to 83-14 monoclonal antibodies: In vitro targeting of brain capillary endothelial cells, www.elsevier.com/locate/ejpb, 2014 Elsevier B.V. vol. 88, pp. 316-324.

Dlugolecki et al, Journal of Membrane Science, Current Status of ion exchange membranes for power generation from salinity gradients, vol. 319, Issue 1-2, Jul. 1, 2008, pp. 214-222.

Figueiredo et al, International Journal of Pharmaceutics, Angiopep2-functionalized polymersomes for targeted doxorubicin delivery to glioblastoma cells. www.elsevier.com/locate/ejpb, 2016 Elsevier B.V. vol. 511, pp. 795-803.

Gribova et al, Chemistry of Materials, Polyelectrolyte Multilayer Assemblies on Materials Surfaces: From Cell Adhesion to Tissue Engineering, 2012, 24, 854-869.

Karlssona et al, Reconstitution of water channel function of an aquaporin overexpressed and purified from Pichia pastoris, FEBS Letters 537 (2003) pp. 68-72.

Kong, RSC Advances, Multiscale simulation of surfactant-aquaporin complex formation and water permeability, RSC Adv., 2014, 4, 37592-37599.

Kowal et al, Biomaterials, Functional surface engineering by nucleotide-modulated potassium channel insertion into polymer membranes attached to solid supports, 2014 Elsevier Ltd. vol. 35, pp. 7286-7294.

Wang, Bio-Inspired Aquaporinz Containing Double-Skinned Forward Osmosis Membrane Synthesized through Layer-by-Layer Assembly, Membranes 2015, 5, 369-384, ISSN 2077-0375 www.mdpi.com/journal/membranes.

(Continued)

*Primary Examiner* — John Kim
(74) *Attorney, Agent, or Firm* — Ziegler IP Law Group, LLC

(57) ABSTRACT

A vesicle in a liquid composition including an amphiphilic diblock copolymer of the $PMOXA_{a-b}$-$PDMS_{c-d}$ type as vesicle membrane forming material, further including as an additive from about 0.05% to about 1% v/v of reactive end group functionalised $PDMS_{e-f}$ and a transmembrane protein. The vesicle optionally includes about 1 to about 12% v/v of triblock copolymer of the $PMOXA_{a-b}$-$PDMS_{c-d}$-$PMOXA_{a-b}$ type as membrane forming material.

20 Claims, No Drawings

(56) References Cited

OTHER PUBLICATIONS

Schroeder, Journal of Controlled Release, Alkane-modified short polyethyleneimine for siRNA delivery, 2011 Elsevier B.V. vol. 160, pp. 172-176.
Wilson et al, European Polymer Journal, Poly(2-oxazoline)-based micro- and nanoparticles: A review, 88 (2017) 486-515.
Thomas Biphys Journal, Feb. 17, 2014, pp. 276a-277a.
International Search Report, Application No. PCT/EP2018/052912, dated Apr. 30, 2018, 3 pages.

* cited by examiner

DIBLOCK COPOLYMER VESICLES AND SEPARATION MEMBRANES COMPRISING AQUAPORIN WATER CHANNELS AND METHODS OF MAKING AND USING THEM

FIELD

The aspects of the disclosed embodiments relate to amphiphilic diblock copolymer based vesicles comprising transmembrane proteins, such as aquaporin water channels (AQPs), and to filtration membranes comprising the vesicles. The aspects of the disclosed embodiments further relate to methods of making the vesicles and separation membranes containing them and to the uses of said membranes.

BACKGROUND

The use of amphiphilic lipids and block copolymers for forming self-assembled vesicles having bilayer or bilayer-like structures is well known in the art, in particular for immobilising amphiphilic membrane proteins, such as aquaporin water channels (AQPs). Vesicles comprising AQPs can then be used to make membranes having immobilised AQPs for applications such as the purification of water (WO2006/122566) or the generation of salinity power (WO2007/033675), in general by depositing the vesicles as a layer or in a film on a supporting substrate, which allows the selective passage of water molecules through the membranes by nanofiltration, reverse osmosis, forward osmosis or pressure retarded osmosis.

WO2013/043118 discloses thin film composite (TFC) membranes in which aquaporin water channels (AQPs) are incorporated in the active layer of the membrane. In addition, it discloses a method of producing thin film composite membranes and their uses in filtration processes, such as nanofiltration and osmotic filtration processes. The TFC membranes comprise lipid-AQP/copolymer-AQP vesicles that are incorporated in the TFC active layer. WO2010/146365 describes preparation of TFC-aquaporin-Z (AqpZ) filtration membranes that use an amphiphilic triblock copolymer as a vesicle forming substance for incorporating immobilised AQPs. WO2014/108827 discloses a hollow fiber (HF) module having fibers modified with a thin film composite (TFC) layer comprising aquaporin water channels in which the aquaporin water channels are incorporated in lipid or block copolymeric vesicles before incorporation into the TFC layer.

However, typically in the prior art, the amphiphilic lipids and block copolymers used in vesicle production are solids that need to be dissolved in harsh solvents, such as tetrachloromethane ($CCl_4$) or chloroform ($CHCl_3$), to solubilise their predominantly hydrophobic portions. In the membrane synthesis, this solvent is evaporated to allow film formation which is then rehydrated to bring the amphiphile into various emulsion forms (such as vesicles), with simultaneous incorporation of the AQP membrane protein. However, in practice, it is often difficult to control the final vesicle size, resulting in disperse emulsions having vesicles ranging in diameter of from about 60 to 80 nm to about 1000 nm or more. There may also be limits to the number of AQPs that can be incorporated in each vesicle, because the membrane proteins need to be aligned according to their amphiphilic structure in the bilayer structure and to match the thickness of the hydrophobic part of the protein and vesicle membrane.

SUMMARY

Broadly, the aspects of the disclosed embodiments relate to the use of PMOXA-PDMS diblock copolymers (poly(2-methyloxazoline)-block-poly(dimethyl siloxane) diblock copolymer), to form self-assembled vesicles with transmembrane proteins, such as aquaporin water channels. The aquaporin vesicles may then be used in the production of separation membranes in which the transmembrane proteins are incorporated or immobilised and active, for example for allowing water molecules to pass through the membrane. For example, for the production of separation membranes comprising the transmembrane proteins, the vesicles may be added to an aqueous liquid composition comprising an aromatic amine, such as a diamine or triamine, e.g., 1,3-diaminobenzene (MPD) applied to the surface of a selectively permeable or semipermeable support, which when brought into contact with a solution of an acid chloride in an organic solvent will participate in an interfacial polymerization reaction to form a thin film composite active or selective layer on said support thus forming a separation membrane wherein said vesicles have become immobilized or incorporated. Thus, the presently disclosed embodiments provide a vesicle in a liquid formulation comprising an amphiphilic diblock copolymer of the $PMOXA_{a-b}$-$PDMS_{c-d}$ type as vesicle membrane forming material, further comprising as an additive of about 0.05% to about 1% v/v of reactive end group functionalised $PDMS_{e-f}$, and a transmembrane protein.

In a certain aspect, the $PMOXA_{a-b}$-$PDMS_{c-d}$ of the vesicle is selected from the group consisting of $PMOXA_{10-40}$-$PDMS_{25-70}$ and mixtures thereof. To increase the robustness of the vesicle it may be preferred to use a mixture comprises at least a first amphiphilic diblock copolymer of the general formula $PMOXA_{10-28}$-$PDMS_{25-70}$ and a second amphiphilic diblock copolymer of the general formula $PMOXA_{28-40}$-$PDMS_{25-70}$. The weight proportion between the first and the second amphiphilic diblock copolymer is usually in the range of 0.1:1 to 1:0.1. The concentration of amphiphilic diblock copolymer in the liquid composition is generally in the range of 0.1 to 50 mg/ml, such as 0.5 to 20 mg/ml, and preferably 1 to 10 mg/ml.

The reactive end group functionalised $PDMS_{e-f}$ (reactive end group functionalized poly(dimethyl siloxane)) of the vesicle may be functionalized with one, two or more of amine, carboxylic acid, and/or hydroxy groups. Suitably, the integer e is selected in the range of 20 to 40, such as 30 and the integer f is selected from the range of 40 to 80, such as 50. In a certain aspect of the disclosed embodiments the reactive end group functionalised $PDMS_{e-f}$ is bis(amino alkyl), bis(hydroxyalkyl), or bis(carboxylic acid alkyl) terminated $PDMS_{e-f}$, such as poly(dimethyl siloxane), bis(3-aminopropyl) or poly(dimethyl siloxane), bis(3-hydroxypropyl). Furthermore, the reactive end group functionalised $PDMS_{e-f}$ may be selected from the group consisting of $H_2N$-$PDMS_{30-50}$, HOOC-$PDMS_{30-50}$, and HO-$PDMS_{30-50}$ and mixtures thereof as cross-linking agent.

The vesicle of the disclosed embodiments may further contain about 1% v/v to about 12% v/v of triblock copolymer of the $PMOXA_{a-b}$-$PDMS_{c-d}$-$PMOXA_{a-b}$ type to increase its integrity. Typically, said vesicle comprises from about 8% v/v to about 12% v/v of triblock copolymer of the $PMOXA_{a-b}$-$PDMS_{c-d}$-$PMOXA_{a-b}$ type. The triblock copolymer of the $PMOXA_{a-b}$-$PDMS_{c-d}$-$PMOXA_{a-b}$ type is typically selected from $PMOXA_{10-20}$-$PDMS_{25-70}$-$PMOXA_{10-20}$.

The vesicle in the liquid formulation of the disclosed embodiments may further comprise a flux improving agent to increase either the water flux or decrease the reverse salt flux. The flux improving agent may be selected among a large group of compounds by is generally preferred as alkylene glycol monoalkyl ether alkylate, beta cyclodextrin, or polyethylene glycol (15)-hydroxystearate. The flux increasing agent is usually present in an amount of 0.1% to 1% by weight of the liquid composition.

While any transmembrane protein may by incorporate in the membrane material disclosed in the presently disclosed embodiments, it is generally desired to use transmembrane protein that transport ions (ion channels) or water (aquaporin water channels). Ion channels include chloride channels and metal ion transporters. Chloride channels in addition to the chloride ion also conducts $HCO_3^-$, $I^-$, $SCN^-$, and $NO_3^-$ in some transmembrane proteins. The metal ion transporters include magnesium transporters, potassium ion channels, sodium ion channels, calcium channels, proton channels etc.

In a preferred embodiment of the present disclosure, the transmembrane protein is an aquaporin water channel. Aquaporin water channels facilitate the transport of water in or out of a cell. In an industrial membrane, the aquaporin water channels ensure the flow of water by osmosis, while other solutes in the solution are rejected.

The vesicle of the present disclosure may be present in a liquid composition before immobilization in a membrane, such as a TFC layer provided on a support membrane. The liquid composition may comprise a buffer to stabilize the vesicles. Before the transmembrane protein, such as aquaporin, is mixed with the other constituents, suitably the transmembrane protein is solubilized in a detergent. The solubilization of the transmembrane protein in a detergent prevent or ameliorate the tendency of the transmembrane protein to precipitate in the aqueous solution. Thus, the vesicles in the liquid composition may further comprise a detergent or a surfactant. The detergent may be selected from the group consisting of lauryl dimethylamine N-oxide (LDAO), octyl glucoside (OG), dodecyl maltoside (DDM) or combinations thereof.

Without wishing to be bound by any particular theory, it is believed that the vesicles containing free available reactive groups on the surface will be not only physically incorporated or immobilised in (adsorbed), but, in addition, chemically bound in the TFC layer, because the reactive free end groups, such as amino groups, hydroxyl groups and carboxyl groups, will participate in the interfacial polymerization reaction with the acyl chloride, such as a trimesoyl chloride (TMC). In this way, it is believed that vesicles will be covalently bound in the TFC layer, leading to relatively higher vesicle loading and thus higher water flux through the membranes. In addition, it is believed that the covalent coupling of vesicles in the TFC layer results in higher stability and/or longevity of the AQPs and AQP-vesicles when incorporated in the selective membrane layer.

The vesicles may be prepared in a liquid composition incorporating a transmembrane protein comprising the step of stirring a mixture of a solution of an amphiphilic diblock copolymer of the $PMOXA_{a-b}$-$PDMS_{c-d}$ type, 0.05% to about 1% of reactive end group functionalised $PDMS_{e-f}$, and a transmembrane protein. To obtain the best result, the stirring is continued for 12-16 hours. Preferred aspects of the preparation method are outlined above.

The presently disclosed embodiments also provide novel separation membranes, such as filtration membranes, such as TFC membranes, having AQPs incorporated in the active layer to facilitate water transport, where the AQPs are incorporated in amphiphilic polymeric bilayer membrane vesicles. The present presently disclosed embodiments further provide liquid compositions comprising the vesicles which can be immobilized in the active layer or rejection layer of various separation membranes (such as filtration membranes), such as nanofiltration membranes, forward osmosis membranes and reverse osmosis membranes.

The aspects of the disclosed embodiments also relate to the preparation of a thin film composite layer immobilizing vesicles incorporating a transmembrane protein on a porous substrate membrane. The method comprises the steps of providing a mixture of vesicles in a liquid composition prepared as disclosed above, and a di-amine or tri-amine compound, covering the surface of a porous support membrane with the mixture, applying a hydrophobic solution comprising an acyl halide compound, and allowing the aqueous solution and the hydrophobic solution to perform an interfacial polymerization reaction to form the thin film composite layer. In a certain embodiment, the hydrophobic solution further comprises a TFC layer modifying agent in an amount of 0.1 to 10% by volume. The TFC layer modifying agent has the purpose to increase the water flow and/or the rejection of solutes. In a suitable embodiment, the TFC layer modifying agent is a C3 to C8 carbonyl compound. As an example, the TFC layer modifying agent is selected among the group consisting of diethylene ketone, 2-pentanone, 5-pentanone, and/or cyclopentanone.

The di-amine compound may be selected among a range of compounds including for example, phenylenediamines, such as m-phenylenediamine, p-phenylenediamine, 2,5-dichloro-p-phenylenediamine, 2,5-dibromo-p-phenylenediamine, 2,4,6-trichloro-m-phenylenediamine, 2,4,6-tribromo-m-phenylenediamine, etc; diaminobiphenyls, such as 2,2'-diaminobiphenyl, 4,4'-diaminobiphenyl, 3,3'-dichloro-4,4'-diaminobiphenyl, 3,5,3',5'-tetrabromo-4,4'-diaminobiphenyl, etc; diaminodiphenylmethanes, such as 4,4'-diaminodiphenylmethane, 3,3'-diaminodiphenylmethane, 2,2'-diaminodiphenylmethane, 3,3'-dichloro-4,4'-diaminodiphenylmethane, 2,2'-dichloro-4,4'-diaminodiphenylmethane, 3,5,3',5'-tetrachloro-4,4'-diaminodiphenylmethane, 3,5,3',5'-tetrabromo-4,4'-diaminodiphenylmethane, etc.; diaminobibenzyls, such as 4,4'-diaminobibenzyl, 3,5,3',5'-tetrabromo-4,4'-diaminobibenzyl, etc.; 2,2-bisaminophenylpropanes, such as 2,2-bis (4'-aminophenyl)propane, 2,2-bis(3',5'-dichloro-4'-aminophenyl)propane, 2,2-bis(3',5'-dibromo-4'-aminophenyl) propane, etc.; diaminodiphenylsulfones, such as 4,4'-diaminodiphenylsulfone, 3,5,3',5'-tetrachloro-4,4'-diaminodiphenylsulfone, 3,5,3',5'-tetrabromo-4,4'-diaminodiphenylsulfone, etc.; diaminobenzophenones, such as 4,4'-diaminobenzophenone, 2,2'-diaminobenzophenone, 3,3'-dichloro-4,4'-diaminobenzophenone, 3,5,3',5'-tetrabromo-4,4'-diaminobenzophenone, 3,5,3',5'-tetrachloro-4, 4'-diaminobenzophenone, etc.; diaminodiphenyl ethers, such as 3,3'-diaminodiphenyl ether, 4,4'-diaminodiphenyl ether, 3,3'-dibromo-4,4'-diaminodiphenyl ether, etc. piperazine, N-phenyl-benzene-1,3 diamine, melanine, and mixtures of such compounds. In a preferred aspect the diamine is selected as m-phenylenediamine (MPD) also known as 1,3-diaminobenzene.

The tri-amine compound may be selected among a range of compounds including for example, diethylene triamine, dipropylene triamine, phenylenetriamine, bis(hexamethylene)triamine, bis(hexamethylene)triamine, bis(3-aminopropyl)amine, hexamethylenediamine, N-tallowalkyl dipropylene, 1,3,5-triazine-2,4,6-triamine, and mixtures of these compounds.

The acyl halide compound usually has two or three acyl halide groups available for reaction with the di- or triamine compound. Suitable examples of diacyl halide or triacyl halide compounds include trimesoyl chloride (TMC), trimesoyl bromide, isophthaloyl chloride (IPC), isophthaloyl bromide, terephthaloyl chloride (TPC), terephthaloyl bromide, adipoyl chloride, cyanuric chloride and mixtures of these compounds.

The amine groups of the di-amine or tri-amine compound will compete with the acid chloride groups of the acyl halide compound for reaction. Generally, the proportion by weight of the di-amine or tri-amine compound to acyl halide compound is from 0:1 to 30:1. When a high density of vesicles on the surface is required the amount of di-amine or tri-amine groups is usually in the lower part of the range, i.e. 0:1 to 1:1, such as between 0:1 to 0.5:1. In other embodiments, a more rigid TFC layer is desired and a selection of the reactants are in the higher end of the range, such as 1:1 to 30:1, preferably 1:1 to 5:1.

The porous support membrane may be formed by a number of materials. The specific choice of material is not essential as long as the support membrane is able sufficiently to support the TFC layer and to withstand decomposition during operation condition, i.e. able to withstand the pressure and/or the chemical environment on either side of the membrane. Specific examples of materials for the porous support membrane include polysulfone or a polyethersulfone polymer. The support may be symmetrical or asymmetrical. In the case the porous support membrane is asymmetrical, the TFC layer is suitably formed on the skin layer face.

The porous support membrane may further be supported by a woven or non-woven mechanical support in some embodiments to increase the mechanical construction and reduce the risk of fractures during operation.

The porous support membrane may any physical appearance known in the art, such as flat sheet membrane, tubular membrane, or hollow fiber membrane. In a certain aspect of the disclosed embodiments a hollow fiber membrane is preferred as it provides for higher packing density, i.e. the active membrane area is higher for a certain volume. The membranes may be grouped together or assembled into a module as known in the art. Thus, a plurality of flat sheet membranes may be assembled into a plate-and-frame membrane configuration. Plate-and-frame membrane systems utilize membranes laid on top of a plate-like structure, which in turn is held together by a frame-like support.

Flat sheet membranes may also be assembled into spiral-wound filter modules. In addition to the flat sheet membranes, the spiral-wound membrane modules include feed spacers, and permeate spacers wrapped around a hollow tube called the permeate tube. Spiral wound elements utilize cross flow technology, and because of its construction, can easily be created in different configurations with varying length, diameter, and membrane material. A spiral-wound filter module may be produced by first laying out a membrane and then fold it in half with the membrane facing inward. Feed spacer is then put in between the folded membranes, forming a membrane sandwich. The purpose of the feed spacer is to provide space for water to flow between the membrane surfaces, and to allow for uniform flow between the membrane leaves. Next, the permeate spacer is attached to the permeate tube, and the membrane sandwich prepared earlier is attached to the permeate spacer using glue. The next permeate layer is laid down and sealed with glue, and the whole process is repeated until all of the required permeate spacers have been attached to the membranes. The finished membrane layers then are wrapped around the tube creating the spiral shape.

Tubular membrane modules are tube-like structures with porous walls. Tubular modules work through tangential cross-flow and are generally used to process difficult feed streams such as those with high dissolved solids, high suspended solids, and/or oil, grease, or fats. Tubular modules consist of a minimum of two tubes; the inner tube, called the membrane tube, and the outer tube, which is the shell. The feed stream goes across the length of the membrane tube and is filtered out into the outer shell while concentrate collects at the opposite end of the membrane tube.

The hollow fiber membranes may be assembled into a module. Thus, the presently disclosed embodiments provide the step of producing a hollow fiber module by assembling a bundle of hollow fibers in a housing, wherein an inlet for passing a first solution is connected to the lumen of the hollow fibers in one end and an outlet is connected to the lumen in the other end, and an inlet is provided in the housing for passing a second solution to an outlet connected to the housing.

The membrane modules produced in accordance with the disclosed embodiments may be used in various configurations, including forward osmosis configurations and reverse osmosis configurations.

Thus, when said transmembrane protein comprises an ion channel or an aquaporin or the like, and said nanostructures comprising said transmembrane protein are immobilized or incorporated in said active or selective layer, it becomes feasible to manufacture novel separation membranes or filtration membranes having diverse selectivity and transport properties, e.g. ion exchange membranes when said transmembrane protein is an ion channel, or water filtration membranes when said transmembrane protein is an aquaporin. Because the transmembrane protein maintains its biologically active folded structure when complexed into the self assembled nanostructures wherein it may be shielded from degradation, even sensitive amphiphilic proteins may become sufficiently stable and, thus, preserve their desired functionality when processed into separation membranes in lab and industrial scale.

Moreover, the disclosed embodiments relates to a liquid composition comprising vesicles having incorporated a transmembrane protein wherein said transmembrane protein is an aquaporin water channel as described above and further comprising a detergent and optionally comprising a triblock copolymer buffer, and a method of making said the liquid composition.

The novel separation membrane of the disclosed embodiments is useful in a method of preparing a pure water filtrate, such as filtering an aqueous solution through a separation membrane in a nanofiltration process or in a reverse osmosis process. For the purposes herein the term "separation membrane" includes selectively permeable membranes and semipermeable membranes for water filtration and water separation, such as asymmetric membranes comprising a micro or nanoporous support layer having formed on one side a selective layer, such as a thin crosslinked aromatic polyamide layer or film or a layer of alternately charged polyelectrolytes (L-B-L), and on the other side being reinforced by a woven or non-woven layer or mesh typically made of polyester fibres.

In addition, the novel separation membrane of the disclosed embodiments is useful in a method for the concentration of a product solution, said method comprising utilizing a separation membrane of the disclosed embodiments mounted in a filter housing or module to extract water from the product solution, e.g. by forward osmosis.

Various aspects of the disclosed embodiments include a hollow fiber (HF) module having hollow fiber membranes modified with a selective layer comprising the liquid aquaporin formulation of the disclosed embodiments; and where said selective layer comprises a thin film composite (TFC) layer formed on the inside surface of the fibers through an interfacial polymerisation reaction; and where said TFC layer comprises aquaporin water channels are incorporated in amphiphilic vesicles, such as diblock or triblock copolymer vesicles, an example of which is described in the examples below.

The novel separation membrane of the disclosed embodiments may additionally be useful in a method for the production of salinity power using pressure retarded osmosis, said method comprising utilizing said separation membrane to increase hydrostatic pressure, and using the increase in hydrostatic pressure as a source of salinity power, cf. WO2007/033675 and WO2014128293 (A1).

Embodiments of the present disclosure will now be described by way of example and not limitation with reference to the accompanying examples. However, various further aspects and embodiments of the disclosed embodiments will be apparent to those skilled in the art in view of the present disclosure.

"and/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the disclosed embodiments and apply equally to all aspects and embodiments which are described.

DETAILED DESCRIPTION

More specifically, the aspects of the disclosed embodiments relate to vesicles as disclosed herein, which vesicle comprises an amphiphilic diblock copolymer of the PMOXA$_{a-b}$-PDMS$_{c-d}$ type optionally comprising from about 0.5% to less than about 8-10% v/v of a triblock copolymer of the PMOXA$_{a-b}$-PDMS$_{c-d}$-PMOXA$_{a-b}$ type as membrane forming material and further comprising as an additive from about 0.01% to about 0.2% v/v of a hydrophobic end-functionalized PDMS$_{e-f}$, and a transmembrane protein.

Examples of said end-functionalised PDMS are, e.g. bis(aminoalkyl) or bis(hydroxyalkyl) terminated PDMS$_{e-f}$, where e-f represents the range of from 30 to 50, such as bis(aminopropyl) terminated poly(dimethyl siloxane) having the formula shown here below where (CAS Number 106214-84-0, Aldrich product No. 481246, average Mn ~5,600 or CAS Number 106214-84-0, product No. 481696 Aldrich, average Mn ~27,000:

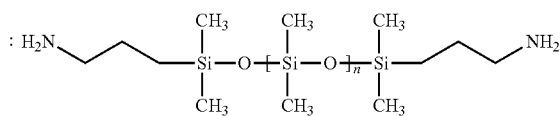

and bis(hydroxyalkyl) terminated poly(dimethyl siloxane) having the formula shown here below where n is approximately 30 to 50 and m and p are both integers between 2 and 5, such as 3 or 4, (CAS Number 156327-07-0, Aldrich product No. 481246, average Mn ~5,600):

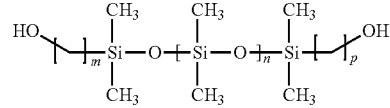

Examples of transmembrane proteins are aquaporin water channels. i.e. aquaporins and aquaglyceroporins, such as those listed in the definitions below.

In addition, the present disclosure relates to a method of making the liquid composition as disclosed, in which a solution of an amphiphilic diblock copolymer of the PMOXA$_{a-b}$-PDMS$_{c-d}$ type optionally comprising about 2 to 10% of triblock copolymer of the PMOXA$_{a-b}$-PDMS$_{c-d}$-PMOXA$_{a-b}$ type as an additive, and from about 0.05% to about 1% of reactive end group functionalised PDMS$_{e-f}$, as a cross-linking agent, is mixed with a transmembrane protein.

As an example, the active layer may be a thin film composite layer formed on the support membrane. A TFC membrane may be formed using alternative reaction components, e.g. as described by Choumou Zhou et al. in Journal of Membrane Science, Volume 471, 1 Dec. 2014, Pages 381-391 "Thin-film composite membranes formed by interfacial polymerization with natural material sericin and trimesoyl chloride for nanofiltration". A highly selective active layer may also be formed on the substrate by the layer-by-layer method (see Wang et al., Membranes, 5(3): 369-384, 2015).

The filtration membrane according to the present disclosure may be prepared by adding a liquid composition comprising said diblock copolymer vesicles, e.g. with aquaporin water channel proteins as the transmembrane protein, during the membrane fabrication process, such as adding the liquid composition to an aqueous MPD solution when forming a TFC layer.

In one aspect of the process of the present disclosure, the transmembrane protein may be an anion channel protein, such as voltage-dependent anion channels, which is useful in preparation of ion exchange membranes for reverse electrodialysis, cf. Dlugolecki et al. (Journal of Membrane Science, 319 214-222, 2008).

Definitions and Terms

The term "transmembrane protein" (TP) as used herein is a type of membrane protein spanning the entirety of the biological membrane to which it is permanently attached in nature. That is, in nature, transmembrane proteins span from one side of a membrane through to the other side of the membrane. Examples of transmembrane proteins are ammonia transporters, urea transporters, chloride channels, and aquaporin water channels.

The term "aquaporin water channel" as used herein includes a functional natural or synthetic aquaporin or aquaglyceroporin water channel, such as aquaporin Z (AqpZ), GIPf, SoPIP2;1, aquaporin 1 and/or aquaporin 2. Aquaporin water channels include bacterial aquaporins and eukaryotic aquaporins, such as yeast aquaporins, plant aquaporins and mammalian aquaporins, as well as related channel proteins, such as aquaglyceroporins. Examples of aquaporins and aquaglyceroporins include: prokaryotic aquaporins such as AqpZ; mammalian aquaporins, such as Aqp1 and Aqp2; plant aquaporins, such as plasma intrinsic proteins (PIP), tonoplast intrinsic proteins (TIP), nodulin intrinsic proteins (NIP) and small intrinsic proteins (SIP), e.g. SoPIP2; 1, PttPIP2; 5 and PtPIP2; 2; yeast aquaporins, such as AQY1 and AQY2; and aquaglyceroporins, such as GlpF and Yfl054. Aquaporin water channel proteins may be prepared according to the methods described herein or as set out in Karlsson et al. (FEBS Letters 537: 68-72, 2003) or as described in Jensen et al. US 2012/0080377 A1 (e.g. see Example 6).

The terms "separation membrane" as used herein includes membranes useful for separating water and, optionally, certain small size solutes including anions and cations, from other solutes, particles, colloids and macromolecules. Examples separation membranes are "filtration membranes" such as nanofiltration (NF) membranes, forward osmosis (FO) membranes and reverse osmosis (RO) membranes. One type of filtration membranes is a "thin film composite" (or TFC) membrane, often classified as nanofiltration and reverse osmosis membranes. TFC membranes are typically made by depositing a polyamide layer on top of a polyethersulfone or polysulfone porous layer on top of a non-woven or woven fabric support. The polyamide rejection layer is formed through interfacial polymerization of an aqueous solution of an amine with a solution of an acid chloride in an organic solvent. TFC membranes may be produced as described in WO 2013/043118 (Nanyang Technological University & Aquaporin A/S). Other types of filtration membranes are those formed by the layer-by-layer (LbL) deposition method, such as described in Gribova et al. (Chem. Mater., 24: 854-869, 2012) and Wang et al. (Membranes, 5(3): 369-384, 2015). For example, the self assembled nanostructure may be embedded or incorporated in the polyelectrolyte multilayer (PEM) films, as outlined in FIG. 4 of Gribova et al.

"Thin-film-composite" or (TFC) membranes as used herein may be prepared using an amine reactant, preferably an aromatic amine, such as a diamine or triamine, e.g., 1,3-diaminobenzene (m-Phenylenediamine, >99%, e.g. as purchased from Sigma-Aldrich) in an aqueous solution, and an acyl halide reactant, such as a di- or triacid chloride, preferably an aromatic acyl halide, e.g. benzene-1,3,5-tricarbonyl chloride (CAS No. 84270-84-8, trimesoyl chloride (TMC), 98%, e.g. as purchased from Sigma-Aldrich) dissolved in an organic solvent where said reactants combine in an interfacial condensation polymerization reaction, cf. Khorshidi et al. (2016) Scientific Reports 6, Article number: 22069, and U.S. Pat. No. 4,277,344 which describes in detail the formation of a composite membrane comprising a polyamide laminated to a porous membrane support, at the surface of the support membrane, e.g. a polyethersulfone membrane. Benzene-1,3,5-tricarbonyl chloride (trimesoyl chloride) is dissolved in a solvent, such as a $C_6$-$C_{12}$ hydrocarbon including hexane (>99.9%, Fisher Chemicals), heptane, octane, nonane, decane etc. (straight chain or branched hydrocarbons) or other low aromatic hydrocarbon solvent, e.g. Isopar™ G Fluid which is produced from petroleum-based raw materials treated with hydrogen in the presence of a catalyst to produce a low odour fluid the major components of which include isoalkanes. Isopar™ G Fluid: Chemical Name: Hydrocarbons, C10-C12, isoalkanes, <2% aromatics; CAS No: 64742-48-9, chemical name: Naphtha (petroleum), hydrotreated heavy (from ExxonMobil Chemical). Alternatives to the reactant 1,3-diaminobenzene include diamines such as hexamethylenediamine etc., and alternatives to the reactant benzene-1,3,5-tricarbonyl chloride include a diacyl chloride, adipoyl chloride, cyanuric acid etc. as known in the art.

The term "diblock copolymer" as used herein means a polymer consisting of two types of monomers, A and B. The monomers are arranged such that there is a chain of each monomer, and those two chains are grafted together to form a single copolymer chain.

The abbreviation $M_n$ means number average molecular weight. It means the total weight of polymer divided by the number of polymer molecules. Thus, $M_n$ is the molecular weight weighted according to number fractions. The abbreviation $M_w$ means weight average molecular weight. The molecular weight weighted according to weight fractions. Molecular mass may be measured by gel permeation chromatography (GPC) in tetrahydrofuran. Polydispersity index defined as Mn/Mw will be determined from the elution curves obtained in GPC.

Size of the vesicles: Preferably, the vesicles of the disclosed embodiments have a particle size of between about 10 nm diameter up to 200 nm diameter depending on the precise components of the vesicles and the conditions used for their formation. It will be clear to those skilled in the art that a particle size refers to a range of sizes and the number quoted herein refers to the average diameter, most commonly mean diameter of that range of particles. The vesicle compositions of the disclosed embodiments comprise vesicles having mean hydrodynamic diameters of 300 nm or less, in some cases mean diameters that are less than 400 nm such as less than 50 nm.

Examples of molar ratios of transmembrane protein to block copolymer is dependent on the transmembrane protein used, the types of copolymers used, and the desired size of the vesicle. As an example, for vesicles of PDMS-PMOXA diblock based vesicles and aquaporin water channels, the molar ratio of transmembrane protein to block copolymer may be between 1:200 to 1:2000, such as 1:400 to 1:1500, such as 1:600 to 1:1000.

The term "self-assembled" as used herein refers to the process by which vesicles are formed through hydrophilic and hydrophobic interaction of amphiphilic substances, such as the diblock copolymers described herein having a relatively hydrophilic PMOXA moiety and a relatively hydrophobic PDMS moiety.

"Hydrodynamic diameter" as used herein represents the hydrodynamic size of nanoparticles in aqueous media measured by dynamic light scattering (DLS) defined as the size of a hypothetical hard sphere that diffuses in the same fashion as that of the particle being measured.

Forward osmosis (FO) is an osmotic process that uses a selectively-permeable membrane to effect separation of water from dissolved solutes. The driving force for this separation is an osmotic pressure gradient between a solution of high concentration, herein referred to as the draw and a solution of lower concentration, referred to as the feed. The osmotic pressure gradient induces a net flow of water through the membrane into the draw, thus effectively concentrating the feed. The draw solution can consist of a single or multiple simple salts or can be a substance specifically tailored for forward osmosis applications. The feed solution can be a dilute product stream, such as a beverage, a waste stream or seawater, cf. IFOA, http://forwardosmosis.biz/education/what-is-forward-osmosis/

Most of the applications of FO, thus fall into three broad categories: product concentration, waste concentration or production of clean water as a bi-product of the concentration process. The term "PAFO" when used herein describes a pressure assisted forward osmosis process. The term "PRO" when used herein describes pressure retarded osmosis which is useful in the generation of osmotic power. Membranes of the disclosed embodiments are useful in all types of forward osmosis processes and may be specifically adapted for each FO type.

The term "reverse osmosis" (RO) is used herein refers to when an applied feed water pressure on a selectively permeable membrane is used to overcome osmotic pressure. Reverse osmosis typically removes many types of dissolved and suspended substances from feed water, including bacteria, and is used in both industrial processes and in the production of potable water. During the RO process, the solute is retained on the pressurized side of the membrane and the pure solvent, the permeate, passes to the other side. Selectivity specifies that the membrane does not allow larger molecules or ions through its pores (holes), while allowing smaller components of the solution (such as solvent molecules) to pass freely. Low pressure reverse osmosis (LPRO) membranes typically operates at a feed water pressure of from about <5 bar and up to a maximum operating pressure of about 25 bar 15 specific flux LMH/bar. LPRO performed at the lower feed pressure ranges, e.g. 2 to 5 bar is sometimes designated ultra-low pressure reverse osmosis. LPRO membranes known in the art have typical operating limits for feed water temperature of about 45° C., feed water pH in the range of 2 to 11, and chemical cleaning in the range of pH 1 to 12.

The present disclosure is further illustrated with reference to the following non-limiting examples Experimental Section Equipment:
Start FPLC connected with Laptop, using Unicorn operating system.
Vacuum stream.
Sterile 0.45 µM vacuum filter cup.
15 mL PP tubes.
Abbreviations:
CV: column volume.
AQP: Aquaporin Z from E. coli.
LDAO: N,N-Dimethyldodecylamine N-oxide (#40234, Sigma).
PAGE: Polyacrylamide gel electrophoresis.
Materials and Chemicals:
HisTrap Gel filtration material (Ni Sepharose 6 Fast Flow #17-5318-03, GE Healthcare) packed into a XK16/20 column (GE Healthcare) at known volume or prepacked 1 ml, 5 ml HisTrap column.
AQP Binding buffer: 20 mM sodium phosphate, 300 mM NaCl, 20 mM imidazole, 10% glycerol, 0.2% LDAO, pH8.0.
LDAO-free AQP Binding buffer: 20 mM sodium phosphate, 300 mM NaCl, 20 mM imidazole, 10% glycerol, pH8.0.
Imidazole-free AQP Binding buffer: 20 mM sodium phosphate, 300 mM NaCl, 10% glycerol, 0.2% LDAO pH8.0.
AQP Elution buffer: 20 mM sodium phosphate, 300 mM NaCl, 200 mM imidazole, 10% glycerol, 0.2% LDAO, pH8.0, ddH$_2$O.
General Purification of Aquaporin and Preparation of Aquaporin Stock Solution Recombinant Production of Aquaporin Z All types and variants of aquaporin water channel proteins, including aquaglyceroporins, may be used in the manufacture of membranes and compositions according to the disclosed embodiments, cf. methods described in WO2010/146365. Representative examples include the spinach aquaporin SoPIP2; 1 protein and the bacterial aquaporin-Z from E. coli.

Functional aquaporin-Z was overproduced in E. coli strain BL21(DE3) bacterial cultures as His-tagged protein with a tobacco etch virus cleavage site. The fusion protein has 264 amino acid and a Mw of 27234 Da. Genomic DNA from E. coli DH5 was used as a source for amplifying the AqpZ gene. The AqpZ gene was amplified using gene specific primers with the addition of a tobacco etch virus cleavage site (TEV); ENLYFQSN at the N-terminus of AqpZ. The amplified AqpZ was digested with the enzyme NdeI and BamHI and then ligated to the similarly digested 6-His tagged expression pET28b vector DNA. The positive clones were verified by PCR-screening. The authenticity of the constructs was then confirmed by DNA sequencing.

The E. coli strain BL21(DE3) was used for expression of the protein. Luria Broth cultures containing 50 µg/ml kanamycin were incubated for 13-16 hours at 37 C, diluted 100-fold into fresh LB broth and propagated to a density of about 1.2-1.5 (OD at 600 nm). Expression of recombinant protein was induced by addition of 1 mM IPTG for 3 hour at 35° C. before centrifugation. Harvested cells were resuspended in ice-cold binding buffer (20 mM Tris pH 8.0, 50 mM NaCl, 2 mM β-mercaptoethanol, 10% glycerol) in the presence of 0.4 mg/ml lysozyme, 50 units Bensonase and 3% n-octyl β-D-Glucopyranoside. The sample was subjected to five times lysis cycles in a microfluidizer at 12,000 Pa. Insoluble material was pelleted by 30 minutes centrifugation at 40,000×g. The supernatant was passed through a Q-Sepharose fast flow column (Amersham Pharmacia), and the flow through was 10 collected. The flow though fraction was topped up with NaCl to 300 mM before loaded onto a pre-equilibrated Ni-NTA column. The column was washed with 100 column volumes of a wash buffer (20 mM Tris pH 8.0, 300 mM NaCl, 25 mM imidazole, 2 mM β-mercaptoethanol, 10% glycerol) to remove non-specifically bound material. Ni-NTA agarose bound material was eluted with five bed volumes of elution buffer (20 mM Tris pH 8.0, 300 mM NaCl, 300 mM imidazole, 2 mM β-mercaptoethanol, 10% 15 glycerol, containing 30 mM n-octyl β-D-Glucopyranoside). AqpZ was further purified with anion exchange chromatography; monoQ column (GE healthcare). The sample mixture was diluted and concentrated to bring the salt and imidazole concentration to approximately 10 mM with Amicon concentrator, membrane cut off 10,000 Da before loading to MonoQ column. The buffer used during anion exchange chromatography were (A) 20 mM Tris pH 8.0, 30 mM OG, 10% glycerol and (B) 20 mM 20 Tris pH 8.0, 1 M NaCl, 30 mM OG, 10% glycerol. The eluted peak fractions containing AqpZ from the ion exchange column was pooled. The purified AqpZ extract was kept frozen at −80° C.

Procedure for Purification of Aquaporin Protein

A batch of frozen extract of aquaporin protein, such as aquaporin Z, AQPZ, e.g. from an E. coli fermentation, was obtained and treated as follows for use in the experiments to produce and characterise membranes comprising protein-PAI nanostructures of the present disclosure.

One day before the purification experiment, the AQP extract (stored at −80° C. freezer) was thawed on ice or in a 4° C. refrigerator. Portions of the buffers and ddH$_2$O were readied at 4° C. The AQP extract was stirred in an adequate chilled beaker on ice bath by a magnetic stick to dissolve any precipitate. 1.5 volumes of pre-chilled LDAO-free AQP binding buffer was gradually added into 1 volume of the solubilized extract (using a further 0.5 volume buffer for rinsing the extract tubes and filtration cup), mixed well and filtered through a sterile 0.45 μM vacuum filter cup. Vacuum was applied to the filter cup to avoid excess foaming and the filtrate was placed on ice to use within 2 hours.

A Histrap column was equilibrated with sterile water followed by AQP Binding buffer at RT. The flow rate was set at 1 ml/min (for 1 mL prepacked column) or 2.5 ml/min (for 5 ml prepacked column and self-packed column). The 3 times diluted extract (on ice water bath) was loaded onto the Histrap column using AKTA program. The flow rate was set at 1 ml/min (for 1 mL prepacked column) or 2.5 ml/min (for 5 mL prepacked column and self-packed column). The loading volume was less than 30 ml/ml resin. The extract flow-through on ice-water bath was collected and stored at 4° C. for further use. The column was washed with 10 CV (column volume) ice cold AQP binding buffer. The flow rate was set at 2.5 ml/min (for 5 ml prepacked column and self-packed column) or set at 1 ml/min for 1 ml prepacked column. The AQP protein was eluted with ice cold AQP elution buffer (10 column volume) at flow rate 2.5 ml/min using ÄKTA program. The fraction volume was set to 10 ml and collection started in 15 mL PP tubes after 0.5-1 CV.

Eluted fractions were capped and stored on ice or 4° C. The AQP purity and conformation was examined by denaturing and native PAGE analysis respectively. Protein concentration was measured by Nanodrop. The extract flow-through may be processed a second and a third time as needed to produce an AQP composition of suitable quality.

When AQP quality analyses are passed, the protein concentration may be adjusted to 5 mg/ml by adding ice cold imidazole-free AQP binding buffer containing 2% LDAO. Finally the AQP was sterilized by filtration through 0.45 μM sterilized cup and stored at 4° C. in refrigerator for use within a month or else stored at −80° C. in a freezer.

EXAMPLES

Preparation of Handmade TFC FO Filtration Membranes

These membranes were made according to the steps outlined below:
a) Dissolve MPD in MilliQ water to get a 2.5% (W/W) concentration, see below
b) Dissolve TMC in Isopar to a final concentration of 0.15% W/V
c) Cover a rectangular shaped membrane, e.g. 5.5 cm×11 cm Membrana 1 FPH PES membrane with about 20 mL/m$^2$ membrane of MPD solution and leave for 30 seconds under gentle agitation
d) Dry the non-active side (back side) with lab drying paper (e.g. Kim-Wipe) for 5-10 seconds
e) Put the membrane on a glass plate and dry gently with N$_2$ until the surface turns from shiny to dim
f) Apply tape around the edges of the membrane (≈1 mm)
g) Put the glass plate with the taped membrane into a glass or metal container, add about 155 mL/m$^2$ membrane TMC-Isopar to one end and rock gently back and forth for 30 seconds
h) Remove glass plate from reservoir and dry with N$_2$ for 10 to 15 seconds After removal of the tape the membrane can be transferred to MilliQ with the newly formed active side up and keep wet during handling in subsequent steps if necessary.
MPD Solution Calculation:

Weigh off 1.05 g of MPD and dissolve in 35 mL of MilliQ. Add 7 mL of liquid AQPZ composition prepared as described herein. Keep the solution topped with inert gas (Ar or N$_2$) as much as possible. This MPD solution is used in Example 1 to 3. Weight off 1.25 g of MPD and dissolve in 46.25 mL of MiliQ. Add 2.5 mL of liquid AQPZ composition prepared as described herein. Keep the solution topped with inert gas (Ar or N$_2$ as much as possible). This MPD solution is used in examples 4 to 6. TFC membranes with liquid AQPZ formulation of 5.5 cm×11 cm sizes was then mounted in a Sterlitech CF042 FO cell (www.sterlitech.com) and subjected to tests of 60 minutes (5 membranes) and tests of 900 minutes (4 membranes) duration in FO mode using 5 μM Calcein in deionised (MilliQ) water as feed and 1 M NaCl aqueous solution as draw and feed and draw speeds of 268 mL/min.

Preparation of BWRO Handmade Membranes

The membranes were made according to the steps outlined below:
a) Provide a support membrane, e.g. a PES non-woven having fingerlike structure, size 5.5 cm×11 cm
b) Mix 3 wt % MPD with 3 wt % ε-caprolactam, 0.5 wt % NMP, and 93.5 wt % DI water to obtain a solution
c) Add 0.1 mg/mL of liquid AQPZ formulation to obtain a suspension
d) Incubate the suspension from c) for 2 hours
e) Prepare TMC solution from 0.09 wt % TMC, 0.9 wt % acetone, and 99.01 wt % Isopar E
f) Dip coat the support membrane in the suspension d) for 30 seconds
g) Apply drying with air knife
h) Add the TMC solution from e) for interfacial polymerization
i) Follow with 2 min drying in fume hood Optional post treatment of TFC membrane following the steps:
4 min 65° C. 10% Citric Acid
2 min DI water
1 min 5% IPA
2 min DI water
1 min 0.1% NaOCl
2 min DI water
1 min 0.2% NaHSO3

Four membranes were made and mounted in a Sterlitech CF042 RO cell, www.sterlitech.com, operated at 5 bar using 500 ppm NaCl as feed for 60 minutes.

Preparation of LPRO Handmade Membranes

The membranes were made according to the steps outlined below:
a) Provide a support membrane, e.g. a polysulfone membrane prepared on non-woven support
b) Mix MPD to obtain 3 wt % and ε-caprolactam to obtain 3 wt % with DI water (3% are the final concentrations in the coating aqueous solution)
c) Add liquid AQPZ formulation to obtain 3 wt % final concentration in the coating aqueous solution
d) Incubate the coating aqueous solution obtained in c) for 15 minutes
e) Prepare coating organic solution (TMC solution), by 0.09 wt % TMC and 99.1 wt % of Isopar E.
f) Dip coat the support membrane in the coating aqueous solution from d) for 30 seconds
g) Remove the excess of the solution from the surface of the support by the air knife set up to 1 bar
h) Add the organic coating solution (TMC solution) from e) for interfacial polymerization
i) Apply drying with air knife at 0.5 bar
j) Post treatment of the TFC membrane:
    a. 4 min 70° C. 20% Citric Acid
    b. 2 min 70° C. DI water k) Optional post treatment of TFC membrane following the steps:
  a. 4 min 65° C. 10% Citric Acid
  b. 2 min DI water
  c. 1 min 5% IPA
  d. 2 min DI water
  e. 1 min 0.1% NaOCl
  f. 2 min DI water
  g. 1 min 0.2% NaHSO3

Membranes were made and mounted in a Sterlitech CF042 RO cell, www.sterlitech.com, operated at a pressure of 5 bar and flow of 60 L/h using 500 ppm NaCl as feed for 60 minutes.

Example 1. Preparation of Vesicles from $PMOXA_{11}$-$PDMS_{34}$ Diblock Copolymer and Preparation of Water Membrane Using Said Vesicles Materials:
Poly(2-methyloxazoline)-block-poly(dimethylsiloxane) diblock copolymer $PDMS_{34}PMOXA_{11}$ was purchased from ChemPilots as a 36 mg/mL aqueous solution. Phosphate buffer 10 mM (PBS) (pH 7.2, 136 mM NaCl, 2.6 mM KCl) was prepared by dissolving 8 g NaCl, 0.2 g KCl, 1.44 g $Na_2HPO_4$ and 0.24 g of $KH_2PO_4$ in 800 mL MiliQ purified $H_2O$, adjusting the pH to 7.2 with HCL and completing the volume to 1 L. N,N-Dimethyldodecylamine N-oxide BioXtra (Lauryldimethylamine N-oxide) (99% purity), LDAO was purchased from Sigma Aldrich.

Poly(dimethylsiloxane), bis(3-aminopropyl) terminated with MW 2500 Da was purchased from Sigma Aldrich and was used as received.

Preparation Method:
1. Prepare a fresh solution of $PDMS_{34}PMOXA_{11}$ by dissolving a 36 mg/mL $PDMS_{34}PMOXA_{11}$ stock solution existing in the stock MQ water to a final concentration of 3 mg/mL in a glass cylinder.
2. Add it in the flask used to prepare the Ex. 1 formulation. Let the solution stay without further stirring.
3. Add 1% poly(dimethylsiloxane), bis(3-aminopropyl) terminated with molecular weight 2500 Da. Stir in the presence of a magnetic stirrer at 170 rotations per min.
4. Stop the stirring and add AQPZ purified stock solution (purified as described above) to achieve a 1/400 AQPZ/PDMS34PMOXA11 molar protein ratio.
5. Stir the mixture overnight at 170 rotations per min (not more than 20 hours) at room temperature.
6. Next morning take the Ex. 1 formulation obtained in the sequence of steps 1 to 5, transfer it to the storage flask and keep it at room temperature (tested up to two months only).

The vesicle formulation of Example 1 was tested from size, water permeability and zeta potential point of view by DLS, Zeta potential and stopped flow measurements in 0.5 M NaCl. The results are a mean of 5 different measurements corresponding to 5 different batches.

TABLE 1

| Ex. 1 vesicle formulation | |
| --- | --- |
| Dh/nm (DLS) | 140 nm ± 20 (85% ± 10%) |
|  | 30 nm ± 10 (15% ± 5%) |
| Zeta potential/mV | 27 ± 8 |
| $Ki/s^{-1}$ | 1890 ± 100 |

Temperature stability and thermal behaviour were tested by warming up 5 mL of Ex. 1 vesicle formulation for 10 min at various temperatures ranging from 30° to 100° C. and their size and water permeability was further determined by DLS and stopped-flow measurements.

Thermal treatment does not affect significantly the stability of the formulation where an increase of the larger size structures from around 120 nm at room temperature to 260 nm. From water permeability point of view no changes can be observed up to 100° C., Ki values from 1700 to 1900 s-1 were recorded.

The formulation was immobilised in and tested on FO handmade membranes having a TFC active layer, e.g. produced such as is described above.

For FO membranes tested the following results were obtained, and which showed a very high calcein rejection and a desired combination of water flux (Jw>5 $L/m^2$ h) and high salt rejection (Js<1.5 $g/,^2$ h) resulting in the ratio Js/Jw being well below 0.3.

TABLE 2

|  | No. of Samples | Jw ($L/m^2h$) | Js ($g/m^2h$) | Js/Jw | Rejection calcein (%) |
| --- | --- | --- | --- | --- | --- |
| Ex. 1 form. | 5 | 5.9 ± 0.62 | 1.29 ± 0.10 | 0.22 ± 0.01 | 99.93 ± 0.05 |

Example 2. Preparation of Vesicles from $PMOXA_{11}$-$PDMS_{34}$ Diblock Copolymer and Preparation of Water Membrane Using Said Vesicles Materials:
Poly(2-methyloxazoline)-block-poly(dimethylsiloxane) diblock copolymer PDMS34PMOXA11 was purchased from ChemPilots as a 36 mg/mL aqueous solution. Phosphate buffer 10 mM (PBS) (pH 7.2, 136 mM NaCl, 2.6 mM KCl) was prepared by dissolving 8 g NaCl, 0.2 g KCl, 1.44 g Na2HPO4 and 0.24 g of KH2PO4 in 800 mL MiliQ purified H2O, adjusting the pH to 7.2 with HCL and completing the volume to 1 L. N,N-Dimethyldodecylamine N-oxide BioXtra (Lauryldimethylamine N-oxide) (99% purity), LDAO was purchased from Sigma Aldrich.

Poly(dimethylsiloxane), bis(3-aminopropyl) terminates with MW 2500 Da was purchased from Sigma Aldrich and was used as received.

Preparation Method
1. Prepare a fresh solution of PDMS34PMOXA11 by dissolving a 36 mg/mL PDMS34PMOXA11 stock solution existing in the stock MQ water to a final concentration of 3 mg/mL in a glass cylinder.
2. Add it in the flask used to prepare the formulation 4 Amino. Let the solution stay without further stirring.
3. Add 0.1% poly(dimethylsiloxane), bis(3-aminopropyl) terminated with molecular weight 2500 Da. Stir in the presence of a magnetic stirrer at 170 rotation per min.
4. Stop the stirring and add AQPZ purified stock solution (purified as described above) to achieve a 1/400 molar protein:polymer ratio.
5. Stir the mixture overnight at 170 rotations per min (not more than 20 hours) at room temperature.
6. Next morning take the Ex. 2 vesicle formulation obtained in the sequence of steps 1 to 5, transfer it to the storage flask and keep it at room temperature (tested up to two months only).

Ex. 2 vesicle formulation was tested from size, water permeability and zeta potential point of view by DLS, Zeta potential and stopped flow measurements in 0.5 M NaCl. The results are measured 5 times for 5 different batches.

TABLE 3

| Ex. 2 formulation | |
|---|---|
| Dh/nm (DLS) | 140 nm ± 20 (90% ± 10%) |
| | 20 nm ± 10 (0% ± 10%) |
| Zeta potential/mV | 11 ± 4 |
| Ki/s$^{-1}$ | 1486 ± 200 |

Temperature stability and thermal behaviour were tested by warming up 5 mL of Ex. 2 vesicle formulation for 10 min at various temperatures ranging from 30° to 100° C. and their size and water permeability was further determined by DLS and stopped-flow measurements.

Thermal treatment does not affect significantly the stability of the formulation, however resulting in a hydrodynamic diameter increase of the larger size structures from around 140 nm at room temperature to around 290 nm. From water permeability point of view no changes can be observed up to 100° C., Ki values from 1400 to 1527 s-1 were recorded.

The formulation was tested on RO, BW-RO low pressure handmade membranes and FO handmade membranes. Results are given in tables 4 and 5 below showing very good reproducibility (low std) of all performance parameters as well as parameters reaching desired values within both RO and FO commercial expectations.

TABLE 4

Ex. 2 vesicle formulation tested on the BW-RO low pressure handmade membranes

| | No. of Samples | Jw/bar (L/m$^2$h)/bar | Rejection NaCl (%) | Applied pressure, bar |
|---|---|---|---|---|
| Ex. 2 formulation | 5 | 7 ± 0.5 | 98.9 ± 0.1 | 5 |

TABLE 5

Ex. 2 vesicle formulation tested on the FO handmade membranes

| | No. of Samples | Jw (L/m$^2$h) | Js (gmh) | Js/Jw |
|---|---|---|---|---|
| Ex. 2 formulation | 3 | 17.44 ± 1.3 | 2.21 ± 0.95 | 0.13 ± 0.07 |

Example 3. Preparation of Vesicles from PMOXA$_{24}$-PDMS$_{65}$+PMOXA$_{32}$-PDMS$_{65}$ Diblock Copolymer Blend and Preparation of Water Filtration Membrane Using Said Vesicles Main Vesicle Forming Materials:
Poly(2-methyloxazoline)-block-poly(dimethylsiloxane) diblock copolymer PDMS$_{65}$PMOXA$_{24}$ (DB1) purchased as a viscous white liquid used as received. Poly(2-methyloxazoline)-block-poly(dimethylsiloxane) diblock copolymer PDMS$_{65}$PMOXA$_{32}$ (DB2) purchased as a viscous white liquid used as received. As additives:
Poly(2-methyloxazoline)-block-poly(dimethylsiloxane)-block-poly-(2-methyloxazoline) triblock copolymer PMOXA$_{12}$PDMS$_{65}$PMOXA$_{12}$ (TB) purchased as a viscous white liquid used as received as a hydrophobicity agent, and bis(3-aminopropyl) terminated poly(dimethylsiloxane) having a molecular weight of 2500 Da purchased as a liquid from Sigma Aldrich used as received as a cross-linking agent or functionalizing agent.

Phosphate buffer 10 mM (PBS) (pH 7.2, 136 mM NaCl, 2.6 mM KCl) was prepared by dissolving 8 g NaCl, 0.2 g KCl, 1.44 g Na$_2$HPO$_4$ and 0.24 g of KH$_2$PO$_4$ in 800 mL MiliQ purified H$_2$O, adjusting the pH to 7.2 with HCL and completing the volume to 1 L. Further detergent additives were N,N-Dimethyldodecylamine N-oxide BioXtra (Lauryldimethylamine N-oxide) (LDAO) was purchased from Carbosynth, and Poloxamer P123 purchased from Sigma Aldrich as a 30% solution in water. AqpZ 5 mg/mL in 0.2% LDAO in the stock (purified as described above).

Preparation Method
1. Prepare P123 solution by dissolving 15 mL P123 in 1 L PBS.
2. Prepare a 0.05% LDAO solution in PBS by dissolving 0.05 g LDAO in 100 mL PBS.
3. In the preparation vessel weight DB1 to reach a concentration of 0.5 g DB1/L of prepared formulation.
4. In the same preparation vessel weight DB1 to reach a concentration on 0.5 g DB2/L of prepared formulation. (1:1 weight ratio DB1 and DB2)
5. In the same preparation vessel weight, add TB hydrophobicity additive to reach a concentration of 0.12 g TB/L of prepared formulation.
6. Add LDAO 5% prepared in step 2 in the proportion 100 mL/L of prepared formulation
7. Add the bis(3-aminopropyl) terminated poly(dimethylsiloxane) to reach a final concentration of 0.1%.
8. Add AqpZ stock solution to reach a concentration of 5 mg/L of prepared formulation and a 1/400 protein:polymer ratio.
9. Add poloxamer P123 solution prepared in step 1 to reach the desired volume of prepared formulation subtracting the volumes of LDAO, bis(3-aminopropyl) terminated poly (dimethylsiloxane) and AQPZ added in step 6 and 8.
10. Stir the mixture from step 10 overnight at 170 rotations per minute (not more than 20 hours) at room temperature to achieve the formulation.
11. Next morning take the prepared Ex. 3 formulation obtained in the sequence of steps 1 to 9, and filter it through 200 nm pore size filters to sterilize it, put it in a closed sealed bottle and keep it at room temperature for not more than 12 months.

Ex. 3 vesicle formulation was tested from size, water permeability and zeta potential point of view by DLS, Zeta potential and stopped flow measurements in 0.5 M NaCl. The results are measured 5 times for 5 different batches.

TABLE 6

| Ex. 3 formulation | |
|---|---|
| Dh/nm (DLS) | 317 nm ± 60 (60% ± 10%) |
| | 80 nm ± 20 (28% ± 5%) |
| | 11 nm ± 4 (5% ± 7%) |
| Zeta potential/mV | 13 ± 2 |
| Ki/s$^{-1}$ | 1286 ± 180 |

Temperature stability and thermal behaviour were tested by warming up 5 mL of Ex. 3 formulation for 10 min at various temperatures ranging from 30° to 100° C. and their size and water permeability was further determined by DLS and stopped-flow measurements.

Thermal treatment does not affect significantly the stability of the formulation where a decrease of the size of the formed structures from around 317 nm at room temperature to 290 nm at 40° C. and further to 185 nm at 80° C. was observed. From water permeability point of view no changes can be observed up to 100° C., Ki values from 1286 to 1321 s-1 up to 100° C. were recorded.

The Ex. 3 vesicle formulation was incorporated in and tested on BW-RO low pressure handmade membranes and FO handmade membranes. Results are given in tables 7 and 8 below showing very good reproducibility (low std) of all performance parameters as well as parameters reaching desired values within both RO and FO commercial expectations.

TABLE 7

Ex. 3 formulation tested on the BW-RO low pressure handmade membranes

| | No. of Samples | Jw/bar (L/m$^2$h)/bar | Rejection NaCl (%) | Applied pressure, bar |
|---|---|---|---|---|
| Ex. 3 Formulation | 3 | 5.7 ± 0.2 | 99.3 ± 0.2 | 5 |

TABLE 8

Ex. 3 formulation tested on the FO handmade membranes

| | No. of Samples | Jw (L/m$^2$h) | Js (gmh) | Js/Jw |
|---|---|---|---|---|
| Ex. 3 Formulation | 3 | 16.36 ± 0.16 | 2.27 ± 0.58 | 0.14 ± 0.03 |

Example 4

Preparation of Vesicles from PMOXA$_{24}$-PDMS$_{65}$+ PMOXA$_{32}$-PDMS$_{65}$ Diblock Copolymer Blend and Preparation of Water Filtration Membrane Using Said Vesicles
Main Vesicle Forming Materials:
Poly(2-methyloxazoline)-block-poly(dimethylsiloxane) diblock copolymer (PDMS$_{65}$PMOXA$_{24}$-DB1) purchased as a viscous white liquid used as received. Poly(2-methyloxazoline)-block-poly(dimethylsiloxane) diblock copolymer (PDMS$_{65}$PMOXA$_{32}$-DB2) purchased as a viscous white liquid used as received.
Additives:
Poly(2-methyloxazoline)-block-poly(dimethylsiloxane)-block-poly-(2-methyloxazoline) triblock copolymer PMOXA$_{12}$PDMS$_{65}$PMOXA$_{12}$ (TB) purchased as a viscous white liquid used as received as a hydrophobicity agent, and bis(3-aminopropyl) terminated poly(dimethylsiloxane) having a molecular weight of 2500 Da purchased as a liquid from Sigma Aldrich used as received as a cross-linking agent or functionalizing agent.

Phosphate buffer 10 mM (PBS) (pH 7.2, 136 mM NaCl, 2.6 mM KCl) was prepared by dissolving 8 g NaCl, 0.2 g KCl, 1.44 g Na$_2$HPO$_4$ and 0.24 g of KH$_2$PO$_4$ in 800 mL MiliQ purified H$_2$O, adjusting the pH to 7.2 with HCl and completing the volume to 1 L. Further detergent additives were N,N-Dimethyldodecylamine N-oxide BioXtra (Lauryldimethylamine N-oxide—LDAO) was purchased from Carbosynth, and Propylene glycol monomethyl ether acetate (PGMEA, >99.5% purity) purchased from Sigma Aldrich.

AqpZ 5 mg/mL in 0.2% LDAO in the stock (purified as described above).
Preparation Method
1. Prepare a 5% by weight PGMEA solution by dissolving 50 g PGMEA in 1l PBS.
2. Prepare a 0.05% by weight LDAO solution in PBS by dissolving 0.05 g LDAO in 100 mL PBS.
3. In the preparation vessel, weigh DB1 to reach a concentration of 0.5 g DB1/L of prepared formulation.
4. In the same preparation vessel weigh DB2 to reach a concentration on 0.5 g DB2/L of prepared formulation. (1:1 weight ratio DB1 and DB2).
5. In the same preparation vessel, add TB hydrophobicity additive to reach a concentration of 0.12 g TB/L of prepared formulation.
6. Add LDAO 5% prepared in step 2 in the proportion 100 mL/L of prepared formulation
7. Add the bis(3-aminopropyl) terminated poly(dimethylsiloxane) to reach a final concentration of 0.1%.
8. Add AqpZ stock solution to reach a concentration of 5 mg/L of prepared formulation and a 1/400 protein:polymer ratio.
9. Add PGMEA 5% solution prepared in step 1 to reach the desired volume of prepared formulation subtracting the volumes of LDAO, bis(3-aminopropyl) terminated poly (dimethylsiloxane) and AQPZ added in step 6 and 8.
10. Stir the mixture from step 9 overnight at 170 rotations per minute (not more than 20 hours) at room temperature to achieve the formulation.
11. Next morning take the prepared Ex. 4 formulation obtained in the sequence of steps 1 to 10, and filter it through 200 nm pore size filters to sterilize it, put it in a closed sealed bottle and keep it at room temperature for not more than 12 months.

Ex. 4 vesicle formulation was tested for size, water permeability and zeta potential by DLS, Zeta potential and stopped flow measurements in 0.5 M NaCl. The results are measured 5 times for 5 different batches.

TABLE 8

Properties of ex. 4 vesicle formulation

| | Ex. 4 formulation |
|---|---|
| Dh/nm (DLS) | 224 nm ± 30 (80% ± 10%) |
| | 58 nm ± 20 (28% ± 5%) |
| Zeta potential/mV | 4.8 ± 0.5 |
| Ki/s$^{-1}$ | 1194 ± 200 s$^{-1}$ |

Preparation of Flat Sheet Membranes (AA Pilot)
The membranes were made according to the steps outlined below:
a. Prepare a support membrane by dissolving 17% of Polysulfone (PS)/Polyethersulfone (PES) in N-Methyl-2-pyrrolidone (NMP)/Dimethylformamide (DMF) and casting on non-woven polyester fabric support followed by phase inversion process in RO water to form support membrane, having and total thickness from 130 um to 180 um. Support membrane has a finger-like/sponge-like structure.
b. Prepare an aqueous solution of 3 wt % MPD and 3 wt % ε-caprolactam using a stirrer.
c. Add Ex. 4 vesicle formulation in an amount in accordance with table 9 below to the above solution to obtain a suspended aqueous solution.
d. Incubate the aqueous solution from c) for 1 hours with stirrer mixing.
e. Prepare organic solution from 0.09 wt % TMC and 99.91 wt % Isopar E f. Dispense support membrane from a roll and allow it to travel into a dip tank containing the above aqueous solution. Alternatively, a slot die is used to dispense the above mentioned aqueous solution on the support membrane. Aqueous solution contact time on the support membrane is controlled at 30-40 seconds.

g. An air knife at vertical direction toward support membrane is used, pressure controlled at 0.2-2 bar, to remove excess aqueous solution.

h. After removal of excess aqueous solution on membrane support, membrane is allowed to travel to a dip tank containing TMC solution prepared in step e). Alternatively, a slot die is used to dispense the TMC solution on the support membrane to allow interfacial polymerization reaction to occur. Organic solution contact time is controlled at 20-30 seconds.

i. To remove excess organic solution, an air knife at vertical direction towards support membrane is used. The pressure is controlled at 0.2 bar to 1.

j. The membrane is after polymerization and removal of excess organic solution directed into a tank containing 10% citric acid at 60-70° C. for around 4 minutes soaking.

k. The membrane is after citric acid soaking allowed to travel into to a tank containing 15% aqueous IPA, at room temperature 22-25° C., for around 2 minutes soaking.

l. Then the membrane is subjected to DI water soaking before hypochlorite post treatment.

m. 2000 ppm aqueous hypochlorite solution is used to post treat the membrane for 1 minute soaking at room temperature, 22-25° C. followed by DI water rinsing.

n. 1% sodium bisulfite is used to post treat the membrane for 1 minute soaking at room temperature, 22-25° C. followed by DI water soaking.

The Ex. 4 formulation incorporated in TW-RO low pressure pilot line made membranes was tested. Results are given in table 9 below showing a flux increase when the amount of the PGMEA increases.

TABLE 9

Ex. 4 formulation tested on the TW-RO low pressure pilot line made membranes

| | % PGMEA solution | Jw/bar $(L/m^2h)/$bar | Standard deviation | Rejection NaCl (%) | Standard deviation | Applied pressure, bar |
|---|---|---|---|---|---|---|
| Ex. 4 Formulation | 0 | 7.40 | 1.09 | 95.44% | 0.9% | 5 |
| | 6% | 8.79 | 0.53 | 95.06% | 0.7% | 5 |
| | 8% | 8.97 | 0.59 | 95.92% | 0.4% | 5 |
| | 10% | 9.91 | 0.41 | 94.42% | 0.6% | 5 |

Test condition: 5 bar, 500 ppm NaCl, 25° C., 1 L/minute flowrate, coupon test.

TABLE 10

Formulation tested on LPRO hand-made membranes

| | % PGMEA solution | Jw/bar $(L/m^2h)/$bar | Rejection NaCl (%) | Applied pressure, bar |
|---|---|---|---|---|
| Ex. 4 Formulation | 0 | 4.19 ± 0.39 | 93.6 ± 2.5 | 5 |
| | 2% | 4.76 ± 0.27 | 96.2 ± 2.6 | 5 |
| | 4% | 4.87 ± 0.51 | 97.0 ± 0.1 | 5 |

Example 5

Preparation of Vesicles from $PMOXA_{24}$-$PDMS_{65}$+$PMOXA_{32}$-$PDMS_{65}$ Diblock Copolymer Blend and Preparation of Water Filtration Membrane Using Said Vesicles Main Vesicle Forming Materials:

Poly(2-methyloxazoline)-block-poly(dimethylsiloxane) diblock copolymer ($PDMS_{65}PMOXA_{24}$-DB1) purchased as a viscous white liquid used as received. Poly(2-methyloxazoline)-block-poly(dimethylsiloxane) diblock copolymer ($PDMS_{65}PMOXA_{32}$-DB2) purchased as a viscous white liquid used as received.

Additives:

Poly(2-methyloxazoline)-block-poly(dimethylsiloxane)-block-poly-(2-methyloxazoline) triblock copolymer $PMOXA_{12}PDMS_{65}PMOXA_{12}$ (TB) purchased as a viscous white liquid used as received as a hydrophobicity agent, and bis(3-aminopropyl) terminated poly(dimethylsiloxane) having a molecular weight of 2500 Da purchased as a liquid from Sigma Aldrich used as received as a cross-linking agent. Phosphate buffer 10 mM (PBS) (pH 7.2, 136 mM NaCl, 2.6 mM KCl) was prepared by dissolving 8 g NaCl, 0.2 g KCl, 1.44 g $Na_2HPO_4$ and 0.24 g of $KH_2PO_4$ in 800 mL MiliQ purified $H_2O$, adjusting the pH to 7.2 with HCl and completing the volume to 1 L. Further detergent additives were N,N-Dimethyldodecylamine N-oxide BioXtra (Lauryldimethylamine N-oxide—LDAO) was purchased from Carbosynth, and Kolliphor® HS 15 or Polyethylene glycol (15)-hydroxystearate (KHS). AqpZ 5 mg/mL in 0.2% LDAO in the stock (purified as described above).

Preparation Method

1. Prepare a 0.5% by weight KHS solution by dissolving 5 g KHS in 1l PBS.
2. Prepare a 0.05% by weight LDAO solution in PBS by dissolving 0.05 g LDAO in 100 mL PBS.
3. In the preparation vessel, weigh DB1 to reach a concentration of 0.5 g DB1/L of prepared formulation.
4. In the same preparation vessel weigh DB2 to reach a concentration on 0.5 g DB2/L of prepared formulation. (1:1 weight ratio DB1 and DB2).
5. In the same preparation vessel, add TB hydrophobicity additive to reach a concentration of 0.12 g TB/L of prepared formulation.
6. Add LDAO 0.05% prepared in step 2 in the proportion 100 mL/L of prepared formulation
7. Add the bis(3-aminopropyl) terminated poly(dimethylsiloxane) to reach a final concentration of 0.1%.
8. Add AqpZ stock solution to reach a concentration of 5 mg/L of prepared formulation and a 1/400 protein:polymer ratio.
9. Add KHS 0.5% solution prepared in step 1 in accordance with table 12 below, to reach the desired volume of prepared formulation subtracting the volumes of LDAO, bis(3-aminopropyl) terminated poly(dimethylsiloxane) and AQPZ added in step 6 and 8.

10. Stir the mixture from step 9 overnight at 170 rotations per minute (not more than 20 hours) at room temperature to achieve the formulation.
11. Next morning take the prepared Ex. 5 formulation obtained in the sequence of steps 1 to 10 and filter it through 200 nm pore size filters to sterilize it, put it in a closed sealed bottle and keep it at room temperature for not more than 12 months.

Ex. 5 vesicle formulation was tested for size, water permeability and zeta potential by DLS, Zeta potential and stopped flow measurements in 0.5 M NaCl. The results are measured 5 times for 5 different batches.

TABLE 11

Ex. 5 vesicle formulation properties

| Ex. 5 formulation | |
|---|---|
| Dh/nm (DLS) | 306 nm ± 20 (40% ± 4%) |
| | 86 nm ± 10 (40% ± 4%) |
| | 14 nm ± 4 (20% ± 2%) |
| Zeta potential/mV | 1.73 ± 0.25 |
| $K_i/s^{-1}$ | 2561 ± 300 $s^{-1}$ |

TABLE 12

Formulation tested on LPRO hand-made membranes

| | % KHS solution | Jw/bar ($L/m^2h$)/bar | Rejection NaCl (%) | Applied pressure, bar |
|---|---|---|---|---|
| Ex. 5 | 0 | 4.03 ± 0.08 | 97.9 ± 0.8 | 5 |
| Formulation | 3% | 4.75 ± 0.08 | 98.2 ± 0.1 | 5 |
| | 5% | 5.23 ± 0.09 | 96.5 ± 1.7 | 5 |

The results reported in table 12 indicates that the flux is improved by the addition of KHS to the coating aqueous solution in any of the tested concentrations. Furthermore, the salt rejection initially increases by the addition of 3% KHS, but it decreases when further amounts of KHS are added. Thus, a concentration of 3% say KHS appears to be the optimal concentration in which the water flux improves, without sacrificing the salt rejection.

Flat sheet membranes were prepared using the pilot line method indicated in example 4 using the above example 5 formulation instead. The data is shown in Table 13 below.

TABLE 13

Formulation tested on LPRO hand-made membranes

| | % KHS solution | Jw/bar ($L/m^2h$)/bar | Rejection NaCl (%) | Applied pressure, bar |
|---|---|---|---|---|
| Ex. 5 | 0 | 7.96 | 98.46 | 5 |
| Formulation | 3% | 10.33 | 98.34 | 5 |
| | 5% | 11.30 | 95.86 | 5 |
| | 7% | 11.49 | 94.18 | 5 |

It is noted that the flux increases about 30% while the rejection remains at about the same level for 3% KHS in the coating aqueous solution. When the concentration of KHS is increased to a level of 5% or 7% the water flux increases, however sacrificing the salt rejection. Thus, the composition using 3% KHS appears to offer the optimal properties and is selected for further modification.

The interfacial polymerisation of the TFC layer using the example 5 formulation comprising 3% KHS in the aqueous phase is further changed by modifying the organic phase with diethylketone (DEK) and mesitylene (Mes).

TABLE 14

Formulation tested on LPRO hand-made membranes

| | % KHS solution | % TFC Modifier | Jw/bar ($L/m^2h$)/bar | Rejection NaCl (%) | Applied pressure, bar |
|---|---|---|---|---|---|
| Ex. 5 | 0 | 0 | 5.2 | 97.5 | 5 |
| Formulation | 3% | 0 | 6.11 | 97.2 | 5 |
| | 3% | 3% DEK | 7.47 | 96.3 | 5 |
| | 3% | 0.9% Mes | 6.21 | 98.1 | 5 |
| | 3% | 1.8% Mes | 6.42 | 98.3 | 5 |

The results of the experiments reported in table 14 show that a flux increase of 22% can be obtained by the addition of 3% DEK to the organic phase. Thus, a total of 43% increase in the flux can be obtained by the addition of 3% KHS to the aqueous phase and 3% DEK to the organic phase without substantially sacrificing the salt rejection.

The addition of Mes to the organic phase does not substantially increase the water flux further, however the salt rejection is increased. Thus, for applications where a high salt rejection is of importance Mes can be added to the organic phase and for applications where a high water flux is of importance DEK can be added to the organic phase.

Example 6

Preparation of Vesicles from $PMOXA_{24}$-$PDMS_{65}$+ $PMOXA_{32}$-$PDMS_{65}$ Diblock Copolymer Blend and Preparation of Water Filtration Membrane Using Said Vesicles.
Main Vesicle Forming Materials:
Poly(2-methyloxazoline)-block-poly(dimethylsiloxane) diblock copolymer ($PDMS_{65}PMOXA_{24}$-DB1) purchased as a viscous white liquid used as received. Poly(2-methyloxazoline)-block-poly(dimethylsiloxane) diblock copolymer ($PDMS_{65}PMOXA_{32}$-DB2) purchased as a viscous white liquid used as received. Additives:
Poly(2-methyloxazoline)-block-poly(dimethylsiloxane)-block-poly-(2-methyloxazoline) triblock copolymer $PMOXA_{12}PDMS_{65}PMOXA_{12}$ (TB) purchased as a viscous white liquid used as received as a hydrophobicity agent, and bis(3-aminopropyl) terminated poly(dimethylsiloxane) having a molecular weight of 2500 Da purchased as a liquid from Sigma Aldrich used as received as a cross-linking agent. Phosphate buffer 10 mM (PBS) (pH 7.2, 136 mM NaCl, 2.6 mM KCl) was prepared by dissolving 8 g NaCl, 0.2 g KCl, 1.44 g $Na_2HPO_4$ and 0.24 g of $KH_2PO_4$ in 800 mL MiliQ purified $H_2O$, adjusting the pH to 7.2 with HCl and completing the volume to 1 L. Further detergent additives were N,N-Dimethyldodecylamine N-oxide BioXtra (Lauryldimethylamine N-oxide—LDAO) was purchased from Carbosynth, and Beta Cyclodextrin (BCD-97% purity).

AqpZ 5 mg/mL in 0.2% LDAO in the stock (purified as described above).
Preparation Method
1. Prepare a 0.5% by weight BCD solution by dissolving 5 g BCD in 1 l PBS.
2. Prepare a 0.05% by weight LDAO solution in PBS by dissolving 0.05 g LDAO in 100 mL PBS.
3. In the preparation vessel, weigh DB1 to reach a concentration of 0.5 g DB1/L of prepared formulation.

4. In the same preparation vessel weigh DB2 to reach a concentration on 0.5 g DB2/L of prepared formulation. (1:1 weight ratio DB1 and DB2).
5. In the same preparation vessel, add TB hydrophobicity additive to reach a concentration of 0.12 g TB/L of prepared formulation.
6. Add LDAO 0.05% prepared in step 2 in the proportion 100 mL/L of prepared formulation
7. Add the bis(3-aminopropyl) terminated poly(dimethylsiloxane) to reach a final concentration of 0.1%.
8. Add AqpZ stock solution to reach a concentration of 5 mg/L of prepared formulation and a 1/400 protein:polymer ratio.
9. Add BCD 0.5% solution prepared in step 1 in the mount indicated in table 14 below to reach the desired volume of prepared formulation subtracting the volumes of LDAO, bis(3-aminopropyl) terminated poly(dimethylsiloxane) and AQPZ added in step 6 and 8.
10. Stir the mixture from step 9 overnight at 170 rotations per minute (not more than 20 hours) at room temperature to achieve the formulation.
11. Next morning take the prepared Ex. 4 formulation obtained in the sequence of steps 1 to 10, and filter it through 200 nm pore size filters to sterilize it, put it in a closed sealed bottle and keep it at room temperature for not more than 12 months. Ex. 6 vesicle formulation was tested for size, water permeability and zeta potential by DLS, Zeta potential and stopped flow measurements in 0.5 M NaCl. The results are measured 5 times for 5 different batches.

TABLE 13

Ex. 6 vesicle formulation properties

| Ex. 6 formulation | |
| --- | --- |
| Dh/nm (DLS) | 198 nm ± 25 (100%) |
| Zeta potential/mV | −1.8 ± 0.15 |
| $K_i/s^{-1}$ | 1100 ± 100 $s^{-1}$ |

Flat sheet membranes were prepared using the pilot line method indicated in example 4 using the above example 6 solution instead. The data is shown in Table 14 below.

TABLE 14

Formulation tested on LPRO hand-made membranes

| | % BCD | Jw/bar (L/m²h)/bar | Rejection NaCl (%) | Applied pressure, bar |
| --- | --- | --- | --- | --- |
| Ex. 6 | 0 | 4.8 ± 0.13 | 95.7 ± 1.2 | 5 |
| Formulation | 3% | 4.9 ± 0.21 | 97.2 ± 0.4 | 5 |

The result of the tested formulations shows that the rejection of NaCl increases significantly, while the flux remains at the same level.

The invention claimed is:

1. A vesicle in a liquid composition, the vesicle comprising an amphiphilic diblock copolymer of the poly(2-methyloxazoline)-block-poly(dimethyl siloxane) (PMOXA-PDMS) type as vesicle membrane forming material, an additive from about 0.05% to about 1% (v/v) based on the liquid composition, of reactive end group functionalized poly(dimethyl siloxane) (PDMS), and a transmembrane protein, wherein the reactive end group is one, two, or more of amine, carboxylic, and/or hydroxy group(s).

2. The vesicle according to claim 1, wherein said PMOXA-PDMS is selected from the group consisting of $PMOXA_{10-40}$-$PDMS_{25-70}$ and mixtures thereof.

3. The vesicle according to claim 2, wherein the mixture comprises at least a first amphiphilic diblock copolymer of the general formula $PMOXA_{10-28}$-$PDMS_{25-70}$ and a second amphiphilic diblock copolymer of the general formula $PMOXA_{28-40}$-$PDMS_{25-70}$.

4. The vesicle according to claim 3, wherein the weight proportion between the first and the second amphiphilic diblock copolymer is in the range of 0.1:1 to 1:0.1.

5. The vesicle according to claim 1, wherein said reactive end group functionalized PDMS is $PDMS_{30-50}$ functionalized with one or more of amine, carboxylic acid, and/or hydroxy group(s).

6. The vesicle according to claim 5, wherein the reactive end group functionalized PDMS is poly(dimethylsiloxane), bis(3-aminopropyl).

7. The vesicle according to claim 1, wherein the transmembrane protein is an aquaporin water channel.

8. The vesicle according to claim 1 further comprising from about 1% (v/v) to about 12% (v/v) based on the liquid composition, of a triblock copolymer of the PMOXA-PDMS-PMOXA type.

9. The vesicle according to claim 8, wherein said triblock copolymer of the PMOXA-PDMS-PMOXA type is selected from $PMOXA_{10-20}$-$PDMS_{25-70}$-$PMOXA_{10-20}$.

10. The vesicle according to claim 1, wherein the liquid composition further comprises a flux improving agent.

11. The vesicle according to claim 10, wherein the flux improving agent is an alkylene glycol monoalkyl ether alkylate, beta cyclodextrin, or polyethylene glycol (15)-hydroxystearate.

12. The vesicle according to claim 10, wherein the flux improving agent is present in an amount of 0.1% to 10% by weight of the liquid composition.

13. A separation membrane comprising a vesicle according to claim 1.

14. The separation membrane according to claim 13, wherein the separation membrane comprises an active layer incorporating the vesicle and a porous support membrane.

15. The separation membrane according to anyone of claim 14, wherein the active layer comprises the vesicle incorporated in a thin film composite (TFC) layer formed on a porous substrate membrane.

16. A method of preparing vesicles in a liquid composition incorporating a transmembrane protein comprising the step of stirring a mixture of a solution of an amphiphilic diblock copolymer of the poly(2-methyloxazoline)-block-poly(dimethyl siloxane) (PMOXA-PDMS) type, 0.05% to about 1% (v/v) based on the of liquid composition, of reactive end group functionalized poly(dimethyl siloxane) (PDMS), and a transmembrane protein, wherein the reactive end group is one, two, or more of amine, carboxylic, and/or hydroxy group(s).

17. The method according to claim 16, further comprising a flux improving agent selected among the group comprising alkylene glycol monoalkyl ether alkylate, beta cyclodextrin, and polyethylene glycol (15)-hydroxystearate.

18. A method of preparing a thin film composite layer immobilizing vesicles incorporating a transmembrane protein on a porous substrate membrane, comprising the steps of
    a. providing a mixture of vesicles in a liquid composition prepared in accordance with claim 16 and a di-amine or tri-amine compound, b. covering the surface of a porous support membrane with the mixture of step a,
c. applying a hydrophobic solution comprising an acyl halide compound, and
d. allowing the aqueous solution and the hydrophobic solution to perform an interfacial polymerization reaction to form the thin film composite layer.

19. The method according to claim 18, wherein the porous support membrane is a flat sheet.

20. The method according to claim 19, comprising the further step of producing a spiral wound membrane module by winding the flat sheet membrane.

* * * * *